Patented Sept. 13, 1932

1,877,587

UNITED STATES PATENT OFFICE

RUDOLPH A. RASCHE, OF CINCINNATI, OHIO

METHOD OF PREPARING APPLES FOR FREEZING

No Drawing.    Application filed January 3, 1931. Serial No. 506,502.

The present invention relates to a method of preserving apples in a substantially fresh condition and has for an object the provision of steps in such a process or method that will prevent the fruit from the characteristic darkening or change of color for a long time.

Another object of this invention is to provide a series of steps in a process preparatory to freezing apples for storage which will prevent the fruit from becoming rubbery or soggy and which enhances the cooking and baking qualities of the fruit while preserving the flavor and appearance.

These and other objects are attained by the method hereinafter set forth in the ensuing specification.

Cold storage apples of the previously available type have been largely undesirable because of the rapidity with which the fruit darkened after being cut open, or in the case of preserved peeled and cored apples after contact with the air after thawing. The fruit is often tough after removal from storage.

In the process of the present invention the fresh ripe apples are first peeled and immediately dropped into a light solution of brine, then cored, seeded and sliced and again placed in the same or similar light solution of brine. This immersion of the peeled and cut fruit in brine retains the fruit out of contact with air and prevents any initial darkening of the fruit.

After a sufficient quantity of the fruit has been thus prepared, e. g. 300 pounds, the entire quantity is removed from the light brine and placed in a single container, (preferably a wooden vessel). This container is filled with a heavier brine and the entire container and contents are then deposited in a vacuum pan and put under as high a vacuum as possible which is retained for about fifteen minutes. Then the vacuum is relieved and atmospheric air pressure or excess air pressure up to about fifty pounds per square inch immediately applied and retained for about fifteen minutes. The fruit is then removed from the brine, thoroughly drained and place in vessels or cans with sugar in the proportion of about twenty pounds of apples to five pounds of sugar after which the vessels or cans are covered to exclude dust or extraneous matter and placed in a suitable refrigerator where they are kept at a temperature of about zero (0°) Fahrenheit until used.

The essential steps of the process are the removal of air from the pores of the fruit and the thorough curing of the fruit with brine. The general equipment necessary to carry out the cold processing of the apples on a production scale consists of suitable containers (preferably at least two in number made of wood) for holding the light brine and the heavy brine, machines (purchasable in the open market) for peeling and for coring and slicing the apples, and a vacuum pan large enough to receive a large wooden vessel full of sliced apples and brine, and equipped, if desired, with and for both evacuation of air and receiving and holding air under at least fifty pounds per square inch pressure.

A characteristic light brine would be water with three percent of salt dissolved therein. This light salt brine is used to receive the apples immediately after dropping from the peeling machine and also to receive the divided fruit as it leaves the coring and slicing machine so that at no time is the meat of the fruit given any extended exposure to air.

The heavy brine may be an eight percent solution of salt in water and it is into this solution that a suitable quantity of the apple pieces are placed and disposed in the vacuum and pressure chamber.

The process largely alters the reaction of the fruit to the elements after taken from cold storage. The fruit may be served as fresh sliced apple and is of excellent flavor and consistency for that purpose. In making pies and the like the cooked or baked fruit is also of fine flavor and has the most desirable cooking qualities and is free of discoloration.

The fruit retains its natural white or green white color, after removal from storage, for an indefinite period of time, for example, if removed from storage and left exposed for a number of days at ordinary temperature the fruit would become sour and unfit for ordinary use but the natural fresh color would remain.

The process employs no harmful ingredients.

The percentages of brine solution set forth herein are not to be considered absolute, the formulæ representing practical solutions which may be varied without departing from the spirit and scope of this invention. It is to be understood that the curing salt brine may be lighter if the period of treatment under the vacuum is extended.

What is claimed is:

1. In the cold processing of fresh apples for cold storage the steps of placing apple pieces in a brine solution and placing them under a vacuum, then relieving the vacuum and placing them under atmospheric air pressure, then sugaring the fruit and placing it in cold storage at a temperature well below freezing.

2. The method of cold processing fresh apple pieces for refrigeration comprising reducing fresh ripe apples to suitable pieces and retaining the pieces in a light brine solution until a suitable quantity has been accumulated, then transferring the accumulated pieces to a strong brine solution and subjecting the pieces in the brine to the high vacuum approximately for a quarter of an hour, then immediately relieving the vacuum and subjecting the fruit in the brine to at least normal air pressure approximately a quarter of an hour, then removing the pieces from the brine and draining them for subsequent sugaring and disposal in a suitable refrigerating means.

3. The cold process for the preparation of fresh ripe apples for refrigeration comprising the steps of removing the air from the flesh of the fruit by vacuum while the fruit is disposed in a solution of curing brine and then subjecting the same to atmospheric pressure while in said brine, then removing the fruit and draining off the brine.

4. The steps in the cold processing of frozen apples comprising peeling a quantity of fresh ripe apples, dropping them into a light salt brine solution as rapidly as they are peeled, then coring and slicing said fruit, leaving each piece in the brine until it is worked upon and returning the slices to the brine again as fast as they are formed, then placing a suitable accumulated quantity of pieces in an eight percent salt brine solution and placing the fruit in the brine under a high vacuum for about one quarter of an hour, then forthwith relieving the vacuum and admitting air pressure, then removing the fruit from the brine and draining it for subsequent sugaring and disposal in refrigerating temperature.

5. The step in the cold process of preparing ripe apple pieces for refrigeration which consists in subjecting the pieces to a salt brine solution for curing while under vacuum.

In testimony whereof, I have hereunto subscribed my name this 31st day of December, 1930.

RUDOLPH A. RASCHE.